US006529849B2

(12) United States Patent
Umezawa et al.

(10) Patent No.: US 6,529,849 B2
(45) Date of Patent: Mar. 4, 2003

(54) THERMAL EFFICIENCY DIAGNOSTIC METHOD AND APPARATUS OF A COMBINED POWER GENERATION PLANT

(75) Inventors: Shuichi Umezawa, Shinagawa-Ku (JP); Hajime Obikawa, Shinagawa-Ku (JP)

(73) Assignee: The Tokyo Electric Power Co. Inc., Tokyo (JP)

( * ) Notice: Subject to any disclaimer, the term of this patent is extended or adjusted under 35 U.S.C. 154(b) by 3 days.

(21) Appl. No.: 09/811,518

(22) Filed: Mar. 20, 2001

(65) Prior Publication Data

US 2001/0034582 A1 Oct. 25, 2001

(30) Foreign Application Priority Data

Mar. 21, 2000 (JP) ........................................ 2000-078624

(51) Int. Cl.[7] .............................................. G01K 17/00
(52) U.S. Cl. ...................... 702/136; 702/181; 702/182; 702/183; 702/185; 700/21; 700/28; 700/29; 700/31; 700/286; 700/287; 700/288; 60/645; 60/39.182; 60/646; 60/660; 60/657
(58) Field of Search ................................. 702/136, 181, 702/182, 183, 185; 416/61; 700/21, 28, 29, 31, 286, 287, 288; 60/645, 39.182, 646, 660, 657

(56) References Cited

U.S. PATENT DOCUMENTS

| | | | | |
|---|---|---|---|---|
| 4,410,950 A | * | 10/1983 | Toyoda et al. | 701/99 |
| 4,563,746 A | * | 1/1986 | Yoshida et al. | 702/185 |
| 5,347,466 A | * | 9/1994 | Nichols et al. | 703/18 |
| 5,559,691 A | * | 9/1996 | Monta et al. | 700/83 |
| 5,791,147 A | * | 8/1998 | Earley et al. | 60/646 |
| 5,794,446 A | * | 8/1998 | Earley et al. | 60/646 |
| 5,886,895 A | * | 3/1999 | Kita et al. | 364/148.01 |

* cited by examiner

*Primary Examiner*—JOhn Barlow
*Assistant Examiner*—Stephen J Cherry
(74) *Attorney, Agent, or Firm*—Oblon, Spivak, McClelland, Maier & Neustadt, P.C.

(57) ABSTRACT

A thermal efficiency diagnostic of a combined power generation plant is performed by using measurement data relative to energy input/output of the respective equipment of the combined power generation plant, recording the design values of heat balance, using measurement data having high measuring accuracy as standard parameters, conducting an optimum state estimation by adjusting the key parameters, which largely affect the diagnostic results so as to be consistent with the standard parameters, so that each deviation of the reference parameters becomes minimum and the probability of the heat balance becomes maximum in a whole plant, comparing the heat balance thus determined with the heat balance based on a design value, analyzing the degree of contribution of performance of each equipment to the thermal efficiency and specifying the equipment which causes the thermal efficiency deterioration in accordance with the degree of contribution.

5 Claims, 9 Drawing Sheets

THERMAL EFFICIENCY DIAGNOSTIC METHOD AND APPARATUS OF A COMBINED POWER GENERATION PLANT

BACKGROUND OF THE INVENTION

1. Field of the Invention

The present invention relates to a thermal efficiency diagnostic method and an apparatus of a combined power generation plant, which can clearly specify a thermal efficiency deterioration causative equipment (i.e. an equipment which causes a deterioration of thermal efficiency) in a case where a fluctuation or deterioration is generated in a thermal efficiency of a combined power generation plant that is already being operated and which can properly and effectively recover the thermal efficiency through inspection, repair and the like.

2. Prior Art

The thermal efficiency of a thermal power generation plant has become a focus of great attention recently in view of two points, that is, fuel saving and reduction of power generation cost. In the case where the thermal efficiency actually changes, it is imperative in the thermal efficiency management to specify which piece of equipment is responsible for the change in the thermal efficiency in a plant.

In this case, the thermal efficiency is a numerical value representing the performance of the power generation plant and expressed as a ratio of the generated electric power to a consumed fuel energy. The thermal efficiency is expressed by the following equation (1).

[Equation1]

$$\text{thermal efficiency } (\%) = \text{generated output (power)}(W)/[\text{fuel heat value } (J/kg) \times \text{fuel consumption}(kg/s)] \times 100 \quad (1)$$

An improvement in the thermal efficiency can lead to a reduction in the fuel consumption. In a power generation plant already existing, a performance management of the entire plant and each piece of equipment are carried out through daily checks and measurements and periodic performance tests, and afterwards, the results are reflected in plant operation and maintenance.

Among the thermal power generation plants, a combined cycle (C/C, ACC) power generation plant represents the most advanced main unit which was introduced for the first time about ten years ago. The combined cycle power generation plant has a high thermal efficiency and a high utilization factor, and in recent years, its availability has considerably increased.

However, after the combined cycle power generation plant has been in operation for about ten years elapsed, certain units begin to show noticeable deterioration in the thermal efficiency, and for this reason, it is imperative from the standpoint of economy to identify the causative equipment and pinpoint the cause of deterioration of the thermal efficiency so as to take remedial measures. In the case of discovering the cause of the deterioration of the thermal efficiency, the combined cycle power generation plant is constructed in a manner in which the gas turbine (GT) and the steam turbine (ST) exist in one unit, with these turbines are connected to one generator. For this reason, it is very difficult to determine as to whether the gas turbine or the steam turbine causes the deterioration of the thermal efficiency. In the conventional cases, although there exists a method for individually calculating each performance of the GT and ST, the above-described method is marred by the problem in its accuracy due to influence of measurement data errors as described herein later.

In the combined power generation plant, the equipment comprising the plant facility is of a large scale, and much time and labor are required for inspection, repair and so on. Moreover, the amount of equipment, time, manpower hours, cost and the like required for such work markedly increases. In the case of large-scale inspection and repair mentioned above, a good recovery result in the thermal efficiency is expected in almost all cases. Thus, in order to obtain this high recovery result, it is necessary to identify the thermal efficiency deterioration causative equipment by the thermal efficiency diagnosis for clarifying which equipment requires inspection and/or repair as compared with the conventional case. On the other hand, as stated previously herein, it is very difficult to determine which the gas turbine or the steam turbine is the cause of the deterioration. Under such circumstances, even if computer processing is introduced to perform the thermal efficiency diagnosis, the cost incurred for its facility, man/hours, management and so on are considerable, and furthermore, there remains a problem that a high diagnosis accuracy is not always obtained.

SUMMARY OF THE INVENTION

The present invention has been made taking the problem encountered in the prior art into consideration. It is, therefore, an object of the present invention to provide a thermal efficiency diagnostic method and an apparatus for a combined power generation plant capable of effectively identifying which equipment causes the deterioration in the thermal efficiency with high accuracy by accurately analyzing influences brought about by performance changes of individual equipment upon the whole plant for the purpose of properly realizing the thermal efficiency recovery through periodic inspection, repair or the like.

In the present invention, a heat balance analysis by optimum state estimation is introduced as a method of improving an accuracy of the thermal efficiency diagnosis of a combined power generation plant. In this case, the heat balance represents input and output of heat energy or electric energy of each equipment in the entire power generation plant.

The inventors of the subject application have made various studies and tests, and as a result, they have obtained the following concept. That is, a performance calculation is not independently carried out with respect to all equipment of the plant, but on the basis of each measurement data in a power generation plant, a decision was made whether optimum consistency can be made when the heat balance of the entire plant is set. It is thereby possible to make a cross check of each measurement data, thus improving the diagnosis accuracy.

More specifically, there is a dispersion of accuracy in measurement data relative to the heat input and output of each equipment of the combined power generation plant. For example, according to the conventional thermal efficiency management method of the combined cycle power generation plant, a performance calculation is carried out independently with respect to the whole of the gas turbine equipment, the whole of the exhaust gas heat steam generator (i.e. HRSG) and the whole of the steam turbine (ST). On the basis of control data measured in the power generation plant, when showing an accuracy estimation according to the conventional method of directly calculating the performance of the main equipment, the accuracy error ($\Delta\eta GT/\eta GT$) of the gas turbine efficiency is 7.8%, the accuracy error ($\Delta\eta HRSG/\eta HRSG$) of the exhaust gas heat recovery boiler efficiency is 3.2% and the accuracy error ($\Delta\eta ST/\eta ST$) of the steam turbine efficiency is 15.6%.

However, it has been found that the above-described percentages are not accurate enough to diagnose the cause with respect to the change (about 2%) in the thermal efficiency of a combined cycle power generation plant, which will usually occurs. Equations for calculating an accuracy error of the efficiency are as follows.

The accuracy of the gas turbine efficiency is obtained from the following equation (2) by differentiating and arranging both sides.

[Equation 2]

$$|\delta\eta GT/\eta GT|=W\text{gas}/(WLNG-W\text{gas})|\delta G\text{gas}/\delta G\text{gas}|+W\text{gas}/(WLNG-W\text{gas})|\delta h\text{gas}/h\text{gas}|+W\text{gas}/WLNG|\delta WLNG/WLNG|=7.8\% \quad (2)$$

The accuracy of the exhaust gas heat recovery boiler efficiency is obtained from the following equation (3) by differentiating and arranging both sides.

[Equation 3]

$$|\delta\eta HRSG/\eta HRSG|=|\delta Wwtr/Wwtr|+|\delta G\text{gas}/G\text{gas}|+|\delta h\text{gas}/h\text{gas}|=3.2\% \quad (3)$$

The accuracy of the steam turbine efficiency is obtained from the following equation (4) by differentiating and arranging both sides.

[Equation 4]

$$|\delta\eta ST/\eta ST|=WGT/(W\text{total}-WGT)|\delta WGT/WGT|+|\delta Wwtr/Wwtr|=15.6\% \quad (4)$$

Considering the above-described error propagation equation (equation (2)), it can be seen that the largest portion of the error factor of the gas turbine efficiency is based on the gas turbine exhaust gas flow rate and the gas turbine exhaust gas temperature. The influence by the gas turbine propagates to the steam turbine with an error approximately twice as the gas turbine.

In the present invention, taking the above matters into consideration, a thermal efficiency diagnosis by a heat balance analysis method incorporating optimum state estimation is employed in order to improve the accuracy in a judgment whether the gas turbine or the steam turbine is responsible for the decrease in the thermal efficiency of combined cycle power generation plant is reduced.

More specifically, by using the measurement data such as temperature, pressure, flow rate, electric power output for measurement installed in a current thermal power station, and a measurement data of a high performance torque sensor and a generator power output having a high measurement accuracy are used as a reference data so as to determine the heat balance of the plant. The standard parameter is rigid value and other parameters are adjusted so as to be consistent the standard parameters through optimum state estimation due to its high measurement accuracy.

In this case, there are key parameters which influence the results of diagnosis to a large degree and the values of key parameters are optimized within a range of the measurement accuracy. For example, the parameters include the gas turbine exhaust gas flow rate (GT exhaust gas flow rate), the gas turbine exhaust gas temperature (GT exhaust gas temperature) and the like.

Here, an optimum state estimation is carried out within a measurement accuracy range with respect to the key parameters mentioned above. The above-described optimum state estimation is to determine a state of the heat balance in which each deviation of reference parameters becomes minimum as a whole and the probability becomes maximum in the plant. A number of reference parameters are properly determined among all kinds of calculation data of the heat balance. Each reference parameter is compared with its reference value, which is the design value or the measured value for example, and each probability of parameters is calculated by taking the deviation from the reference value and the accuracy of the reference parameters into consideration. From each probability of the parameters, the entire probability that the heat balance occurs is calculated in optimum state estimation. In the case where the probability does not become maximum, adjusting the key parameter is repeated. As a function of the reference parameter for calculating the probability, for example, a normal distribution function based on the calculation/measurement accuracy each deviation or the integration of the normal distribution function is used.

The deviations of the reference parameters in the plant are as follows.

(1) Deviation of steam turbine efficiency between design value and calculation value.

The calculation value of the efficiency in the performance test of the steam turbine should not exceed the design value. Therefore, the probability function is determined so that the probability becomes high when the calculation value is less than the design value and becomes low when the calculation value is larger than the design value.

(2) Deviation of design heat transfer performance value of exhaust gas heat recovery steam generator between design value and calculation value.

The calculation value of the efficiency in a performance test of the exhaust gas heat recovery steam generator should not exceed the design value. Therefore, the probability function is determined so that the probability becomes high when the calculation value is less than the design value and becomes low when the calculation value is larger than the design value.

(3) Deviation of gas turbine efficiency between design value and calculation value.

The calculation value of the efficiency in a performance test of the gas turbine should not exceed the design value. Therefore, the probability function is determined so that the probability becomes high when the calculation value is less than the design value and becomes low low when the calculation value is larger than the design value.

(4) Deviation of exhaust gas heat recovery steam generator (HRSG) efficiency between input/output method and heat loss method.

In the HRSG efficiency, the value by the input/output heat method and the value by the loss method will naturally coincide with each other. Therefore, the probability function is determined so that the probability becomes high when they are consistent and becomes low when they are different from each other.

(5) Deviation between the calculation values (power output, temperature, etc.) and their measured values.

The values must be consistent. Therefore, the probability function is determined so that the probability becomes high when the calculation value is consistent with the measured value and becomes low when the calculation value is different from the measured value.

a) Deviation between power output values of GT and ST calculated by the input/output heat process and deviation between values measured by torque sensor, etc.

b) Deviation between an internal gas temperature of HRSG calculated by using the optimum value of GT outlet temperature and its measured value.

c) Deviation between a concentration value of exhaust gas $O_2$ calculated using the optimum value of GT exhaust gas flow rate and its measured value.

d) Deviation between the optimum value of GT exhaust gas flow rate and its measured value.

e) Deviation between the optimum value of GT exhaust gas temperature and its measured value.

All the values in the above items a) to e) will naturally coincide with each other.

The following is an outline of the procedure for conducting the thermal efficiency diagnosis of the combined cycle power generation plant.

(1) To input a measuring data (PID) of a power generation plant to a computer.

(2) To perform calculation of optimum state estimation by taking a data accuracy into consideration so as to determine the heat balance.

(3) To compare the heat balance based on a design with the current heat balance.

(4) To analyze a degree of contribution of each equipment performance to the thermal efficiency.

(5) To specify the thermal efficiency deterioration causative equipment.

Taking the objects and the above matters into consideration, the present invention provides, in one aspect, a thermal efficiency diagnostic method of a combined power generation plant, comprising the steps of:

using measurement values of parameters relative to an energy input and an output with regard to respective equipments of a combined power generation plant including a gas turbine facility and a steam turbine facility, etc., and recording a design value of each equipment;

using measurement data having high accuracy as standard parameter, which is rigid through optimum state estimation of a heat balance;

using measurement data, which affect diagnostic results to a large degree and which are difficult to be measured with high accuracy, as key parameters;

using a number of calculation data of the heat balance as reference parameters, which are compared with their reference values in order to calculate the entire probability of the heat balance;

conducting optimum state estimation of the heat balance by adjusting the key parameters so as to be consistent with the standard parameters and so that each deviation of reference parameters becomes minimum as a whole and the probability becomes maximum in the plant;

comparing the heat balance thus determined with the heat balance based on a design value;

analyzing degree of contribution of performance of each respective equipment to thermal efficiency; and specifying an equipment which causes heat efficiency deterioration in accordance with the degree of contribution.

In preferred examples of this aspect, the parameters of the energy input and the energy output include at least one item of temperature, pressure, flow rate and electric power output.

A generator power output is used as the standard parameter having high measurement accuracy, and a gas turbine exhaust gas flow rate and a gas turbine exhaust gas temperature are used as the key parameters which affect the diagnostic results to a large degree and which are difficult to be measured with high accuracy and to be adjusted through optimum state estimation.

A deviation of HRSG efficiency between the different calculation methods, an ST efficiency between the calculation value and the design value, a GT efficiency between the calculation value and the design value, a turbine power output between the measurement value by a torque sensor and the calculation value, etc. are used as reference parameters to calculate the probability of the heat balance.

In this aspect, the parameters of the energy production and the energy consumption includes at least one of temperature, pressure, flow rate and electric power output. A generator power output is used as a measuring value of the equipment having a high measuring accuracy. A gas turbine exhaust gas flow rate and a gas turbine exhaust gas temperature are used as a measuring value of an equipment which is a key parameter of the diagnosis and which is hard to be measured with high accuracy.

In another aspect of the present invention, there is also provided a thermal efficiency diagnostic apparatus of a combined power generation plant, comprising:

a sensor for measuring heat input and output of respective equipments constituting a combined power generation plant including a gas turbine facility and a steam turbine facility;

a memory for storing measurement data output from the sensor together with a design value and a calculation value of parameters related to a heat balance;

a heat balance calculating element for accurately calculating energy input and output of individual equipment in the entire plant;

an optimum state estimation element for calculating an optimum heat balance by using accurate measurement values as standard parameters, which are always rigid, and adjusting key parameters, which largely influence result of diagnosis and are difficult to be obtained with high accuracy, so that a deviation of reference parameters becomes minimum in the entire plant and the probability that of the heat balance of the plant becomes maximum;

a comparing element for comparing the heat balance thus determined by the optimum state estimation element with the heat balance based on the design value; and a specifying element for analyzing a degree of contribution of performance of each equipment to thermal efficiency and specifying the equipment which causes thermal efficiency deterioration on the basis of the degree of contribution.

As is evident from the above description of the preferred embodiment, according to the present invention, the optimum state evaluation is used to specify the portion or equipment to which the deterioration is caused, thus improving an accuracy of the heat efficiency diagnosis in a combined power generation plant. Furthermore, it is possible to effectively perform the heat efficiency diagnosis and to accurately analyze an influence of the performance change of each of the equipments and the like to whole the power plant. Furthermore, it is also possible to more properly recover a heat efficiency through the periodic inspection, repair and the like and to obtain a great effect in economics.

The nature and further characteristic features of the present invention will be made more clear from the following descriptions made with reference to the accompanying drawings.

BRIEF DESCRIPTION OF THE DRAWINGS

In the accompanying drawings:

FIG. 4A to FIG. 4F are graphs showing a deviation and a probability function used in the embodiment;

DESCRIPTION OF THE PREFERRED EMBODIMENT

One embodiment of thermal efficiency diagnostic method and apparatus of a combined power generation plant according to the present invention will be described hereunder with reference to the accompanying drawings.

In this case, a combined power generation plant applied as a diagnostic object of this embodiment is a 160 MW power output plant having a gas turbine and a steam turbine which are connected to the same generator by each shaft.

Figure 1:
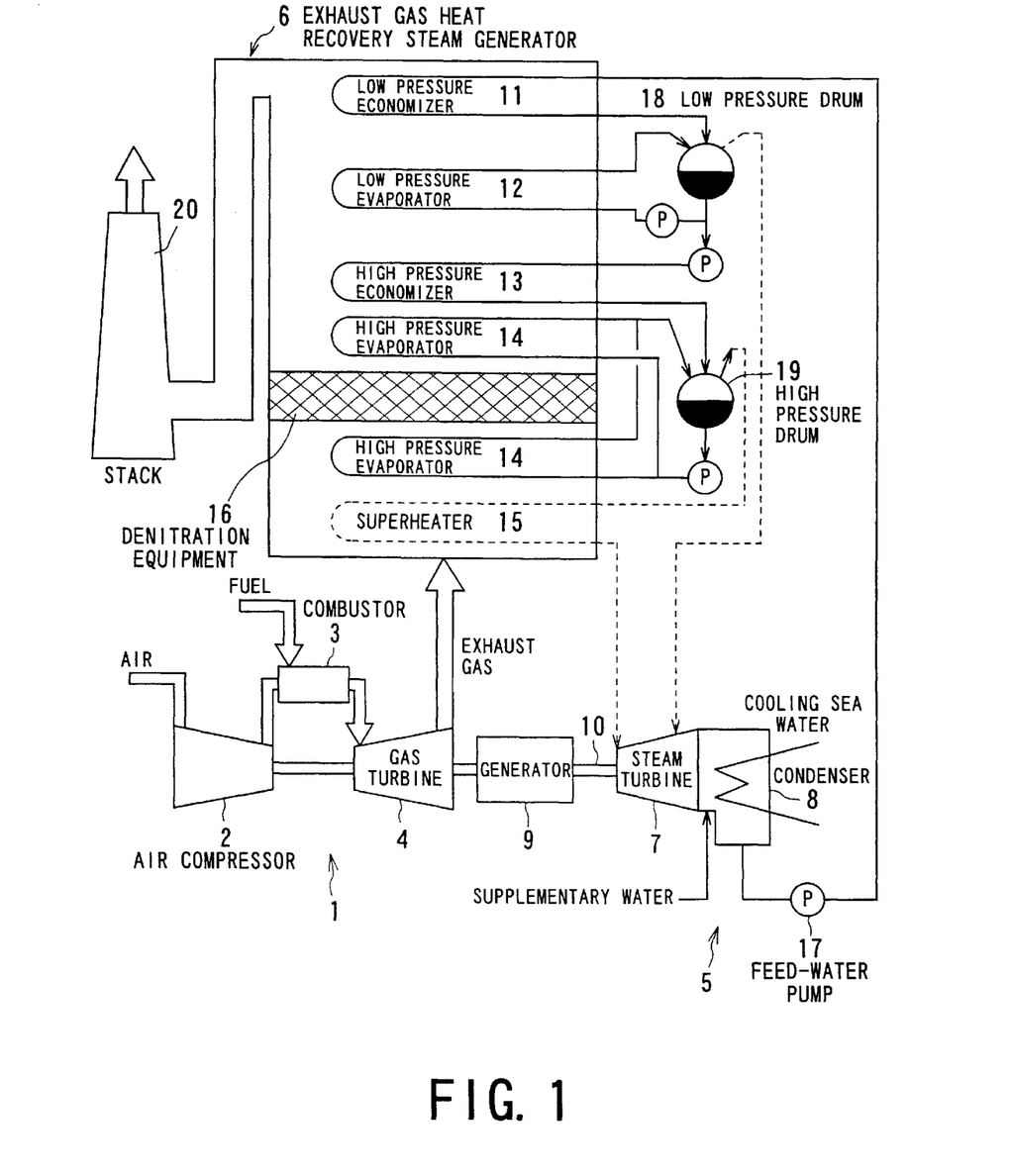
FIG. 1 shows one embodiment of the present invention, and is a system diagram showing a structure of a combined power generation plant which is an object of heat efficiency diagnosis.

FIG. 1 is a system diagram showing a structure of a combined power generation plant which is an object of thermal efficiency diagnosis of the present invention. As shown in FIG. 1, the combined power generation plant of this embodiment includes an air compressor 2, a combustor 3 and a gas turbine 4, which are constructed as a gas turbine facility (equipment) 1. Furthermore, the combined power generation plant includes an exhaust gas heat recovery generator 6 using an exhaust gas heat of the gas turbine 4, a steam turbine 7 and a condenser 8, which are constructed as a steam turbine facility (equipment) 5. A generator 9 is connected to the gas turbine 4 and the steam turbine 7 by each shaft 10.

In an operation, a fuel is burned in the combustor 3 using air compressed by the air compressor 2, and then, the gas turbine 4 is driven by a combustion gas. An exhaust gas discharged from the gas turbine 4 is supplied to the exhaust gas heat recovery generator 6. The exhaust gas heat recovery generator 6 has heat exchangers such as a low pressure economizer 11, a low pressure evaporator 12, a high pressure economizer 13, a high pressure evaporator 14 and a superheater 15, and a denitration equipment 16, as a gas supply section. These heat exchangers heat a feed-water supplied from the condenser 8 via the feed-water pump 17 so as to generate a steam.

The steam thus generated is separated into steam and water by a low pressure drum 18 and a high pressure drum 19, and then, a steam thus separated is supplied to the steam turbine 7 so as to drive the same. Then, the generator 9 is driven by the power of the gas turbine 4 and the steam turbine 7, enabling power generation. The power output ratio of the gas turbine 4 to the steam turbine 7 is about 2:1. Moreover, an exhaust gas heat value is about 70% with respect to a fuel 100%, and then, an energy for about 30% which can be obtained by subtracting the exhaust gas heat value from 100% is used for power generation in the GT. In general, in a flow rate sensor for measuring an exhaust gas flow from the gas turbine 4, there exists a measuring error of ±3.2%, while furthermore, in an exhaust gas temperature, there exists a measuring error of ±5° C. For this reason, an error in the calculation of a gas turbine efficiency is 7 to 8%, which is considerably large.

Supplementary water is supplied to the condenser 8. Heat exchange in the condenser 8 is carried out by using the sea water for cooling. The exhaust gas supplied for heat exchange in the exhaust gas heat recovery generator 6 is purified by the denitration equipment 16, and thereafter, is discharged from a stack 20.

Next, with reference to FIG. 2 to FIG. 4, the heat efficiency diagnostic method and apparatus will be described below.

Figure 2:
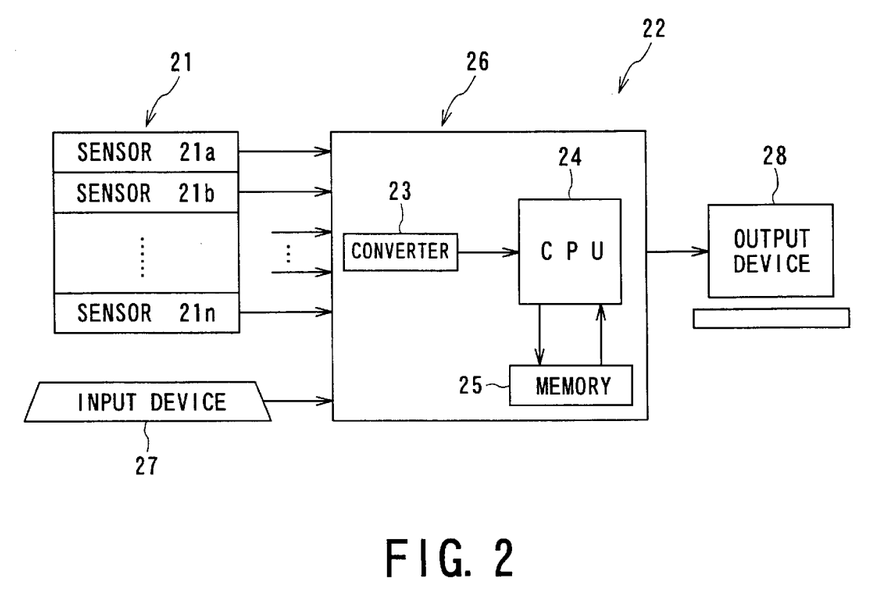
FIG. 2 is a view showing a system diagram of a heat efficiency diagnostic apparatus according to the embodiment.
Figure 3:
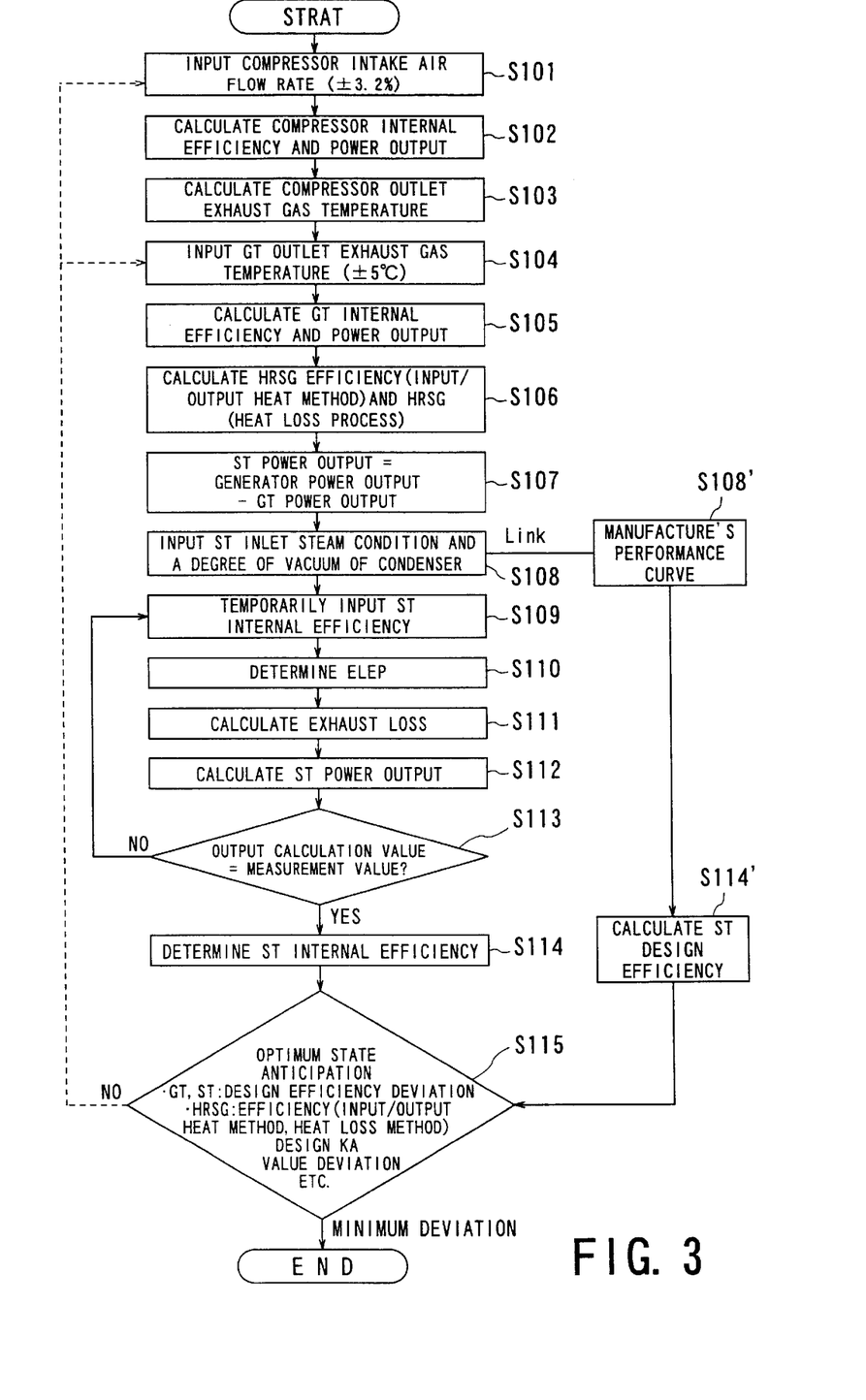
FIG. 3 is a flowchart showing procedure or steps for thermal efficiency diagnosis using the thermal efficiency diagnostic apparatus of FIG. 2.

FIG. 2 shows a system diagram of a thermal efficiency diagnostic apparatus according to the present embodiment, FIG. 3 is a flowchart showing a procedure or steps for conducting or performing the thermal efficiency diagnosis and FIG. 4 is a graph showing a probability and a deviation used in the case of performing the heat efficiency diagnosis.

As shown in FIG. 2, the thermal efficiency diagnostic apparatus has a plurality of sensors $21a \ldots 21n$ for making a measurement relative to a heat efficiency, and a computer system 22 for storing measured data from these sensors and executing data processing. The computer system 22 includes a system body 26, an input device 27 and an output device 28, which are connected to the system body 26. The system body 26 includes a converter 23 such as an A/D converter, a CPU 24 for executing various calculations, and a memory 25 for storing a necessary information and communicating with the CPU 24.

Each of the sensors $21a$ to $21n$ is arranged on each heat input/output section of the gas turbine facility 1 and the steam turbine facility 5, etc. of the combined power generation plant shown in FIG. 1. For example, these sensors measure a compressor inlet air flow rate, a combustor inlet exhaust gas temperature, gas turbine (GT) exhaust gas temperature and flow rate, the HRSG exhaust gas temperature, the ST inlet steam temperature, the generator power output and so on, and then, these measured data are stored in the computer system.

For these measured data, each measurement accuracy is decided by considering the deviation in data.

In this embodiment, the generator power output and other similar data have almost no measurement error and are regarded as highly accurate data. Therefore, the data are stored as the standard parameters which are fixed values through optimum state estimation in each address of the memory 25.

On the other hand, these data relative to the compressor inlet air flow rate and the GT exhaust gas temperature include an error range (±3.2% with respect to the compressor inlet air flow rate, ±5° C. with respect to the GT exhaust gas temperature). Therefore, these data are captured in the computer system 22 are then temporarily stored as the key parameters in each address of the memory 25, and thereafter, are adjusted within each range of measurement accuracy as as to become consistent with the standard parameters in the CPU 24.

In this embodiment, the CPU 24 calculates the GT efficiency and output on the basis of the GT input/output heat data including the key parameters.

Furthermore, the ST internal efficiency is temporarily input using an input device 27.

The CPU 24 calculates the ST output by considering steam expansion line of the ST interior on the basis of the ST input/output heat data including the ST internal efficiency. Following this, data such as the key parameters and the ST internal efficiency input temporarily include some degree of error at first. The generator power output calculation value can be obtained from the GT output and the ST output calculated by using the temporary input data.

Then, the generator power output measured data is output to the CPU 24 as comparative standard values whether or not the generator power output calculation value obtained from the temporary input data coincides with the actual power output value. As a result of the comparison, in the case where the generator power output calculation value is different from the actual power output value, a decision is made to enable the initially temporary input value to contain an error. For this reason, the generator power output measured data is applied as a standard value of optimum state estimation whereby the key parameters are adjusted for consistency.

In the CPU 24, the optimum state estimation is conducted for determining the heat balance of the plant so that each deviation of the reference parameters becomes minimum as a whole, while probability of the heat balance becomes maximum. A number of reference parameters are properly determined among all kinds of calculation data of the heat balance. Each reference parameter is compared with its reference value, which is the design value or the measurement value, for example, and each probability of parameters is calculated by taking the deviation from the reference value and the accuracy of the reference parameter into consideration. From each probability of the parameters, the entire probability that the heat balance occurs is calculated in an optimum state estimation. In the case where the probability does not become maximum, key parameter adjusting is repeated. As a function of the reference parameter for calculating the probability, for example, a normal distribution function based on the calculation/measurement accuracy of each deviation or the integration of the normal distribution function is used.

The deviations of the reference parameters in the plant are as follows.

(1) Deviation of steam turbine efficiency between design value and calculation value
(2) Deviation of design heat transfer performance value of exhaust gas heat recovery steam generator between design value and calculation value
(3) Deviation of gas turbine (GT) efficiency between design value and calculation value
(4) Deviation of exhaust gas heat recovery steam generator (HRSG) efficiency between the input/output method and the heat loss method
(5) Deviations between the calculation values (power output, temperature, etc.) and their measured values
 a) Deviation between power output values of GT and ST calculated by the input/output heat method and values measured by torque sensor, etc.
 b) Deviation between internal gas temperature of HRSG calculated by using the optimum value of GT outlet temperature and its measured value
 c) Deviation between concentration value of exhaust gas O2 calculated by using the optimum value of GT exhaust gas flow rate and its measured value
 d) Deviation between optimum value of GT exhaust gas flow rate and its measured value
 e) Deviation between optimum value of GT exhaust gas temperature and its measured value The data mentioned above are all stored and held in the memory 25. Thus, the heat balance of the operating plant is decided by means of the optimum state estimation.

Furthermore, another address of the memory 25 stores the set of data related to the heat balance based on the design by the manufacturer.

Moreover, in this embodiment, an influence coefficient representing the degree of ratio that performance change of each equipment has on overall plant efficiency is previously calculated by a heat balance program. Then each influence coefficient is input to the CPU 24 via the input device 26, and the heat balance decided by optimum state estimation is compared to that of the design. By considering the performance change of each equipment and the influence coefficient, the contribution of each equipment to the plant efficiency is calculated so as to be stored in the memory 25. Then, the CPU 24 specifies the thermal efficiency deterioration causative equipment on the basis of the degree of contribution to the thermal efficiency of each equipment, and finally, outputs the results to the output device 27 in the form of a graph or the like.

In this embodiment, the heat balance of analysis procedure is prepared by a computer program. This procedure will be described below with reference to the flowchart shown in FIG. 3.

After the program starts, the inlet air flow rate measured value of the air compressor 2 is input to the computer system 22 (Step S101). The compressor inlet air flow rate measured value contains measurement error, and therefore, in this embodiment, ±3.2% measurement error is set up. Then, as the compressor inlet air flow rate measured value has a large effect for calculating the gas turbine efficiency, the measurement error can be minimized by adjusting the value within the measurement error range by means of optimum state estimation.

Following this, the internal efficiency and the power output calculation of the air compressor 2 (Step S102), and the outlet exhaust gas temperature calculation of the combustor 3 (Step S103) are successively made by using the input inlet air flow rate value.

Next, the outlet exhaust gas temperature measured value of the gas turbine 4 is input (Step S104). The gas turbine exhaust gas temperature measured value includes the measurement error, and therefore, in the described embodiment, ±5° C. measurement error is set. In this case, the gas turbine exhaust gas temperature measured value greatly affects the calculation of the gas turbine efficiency. Therefore, the value is adjusted within the measurement error by convergence calculation so that the error is eliminated.

Then, the internal efficiency and the power output of the gas turbine 4 are calculated by using the input gas turbine exhaust gas temperature (Step S105), and sequentially, the efficiency of the exhaust gas heat recovery steam generator 6 is calculated by the input/output heat method and the heat loss method. The input/output heat method is a method of calculating HRSG efficiency from the heat input by the exhaust gas and the heat output by the steam generated in the HRSG 6. Then, it is necessary to use the measured feedwater flow rate. The value is measured by a feedwater flow meter previously installed. Moreover, the heat loss method is a method of calculating the heat loss rate which is the rate of the exhaust gas energy to the stack for the GT exhaust gas energy to the HRSG and subtracting the calculated rate from 100% so as to determine the HRSG efficiency (Step S106).

Thereafter, the gas turbine power output value can be obtained by subtracting the GT exhaust gas energy from the fuel input in Step S105. Furthermore, the power output of the steam turbine 7 is obtained by subtracting the GT output from the power output of the generator 9 measured with high accuracy in Step S107.

Moreover, the inlet steam condition of the steam turbine 7 and the vacuum measured value of the condenser 8 are input to the computer system 22 (Step S108). Then, the internal efficiency of the steam turbine 7 is temporarily input (Step S109). On the basis of the above-described values, the steam turbine power output (Step S112) is determined with the calculation of the steam energy (ELEP) at the steam turbine outlet (Step S110) and the calculation of the exhaust gas loss (Step S111).

Then, the ST output value calculated in Step S112 and the ST output value calculated in Step S107 are compared with each other (Step S113). In the case that both values differ from each other, the procedure of Step S109, where the adjusted ST internal efficiency is input, is repeated until both values coincide with each other. Thus, the convergence of the ST internal efficiency is made and the final steam turbine internal efficiency is determined (Step S114).

On the other hand, the ST inlet steam condition and the degree of vacuum of the condenser input in Step S108 is linked with the manufacturer's performance curve suggested by the equipment manufacturer (Step S108'). Moreover, the design efficiency of the steam turbine internal efficiency is calculated by the manufacturer's performance curve (Step S114'). For example, a steam turbine efficiency based on the value determined in Step S114 should not exceed the steam turbine efficiency based on the design value calculated in Step S114'. Likewise, the gas turbine efficiency should not exceed the design value. Therefore, in the HRSG efficiency, the value calculated by the input/output heat method and the value calculated by the heat loss method should coincide with each other.

In addition to the above-described parameters, more specifically, deviation between calculated and design values in heat transfer performance (KA value) of the superheater (SH) in the HRSG from design, etc. are taken into consideration. Finally, the optimum state estimation is conducted in order to determine the heat balance state of the plant in which each deviation of these reference parameters becomes minimum as a whole, and the probability becomes maximum (Step S115).

In the case where each deviation is not in the optimum state (No), the deviations can be reduced by adjusting the input value of the compressor inlet air flow rate (Step S101) and the input value of the gas turbine outlet exhaust gas temperature (Step S114). These values are thereby converged until the deviation reaches the optimum state.

Figure 4A:
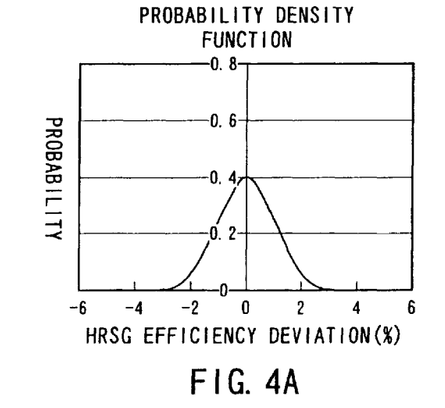
Figure 4B:
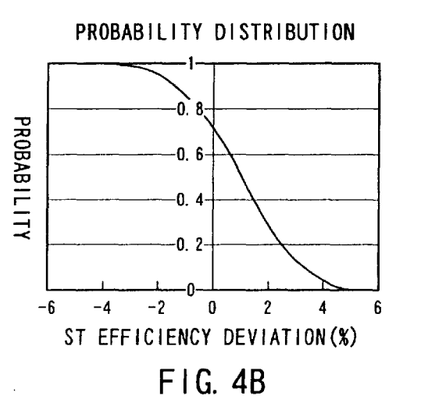
Figure 4C:
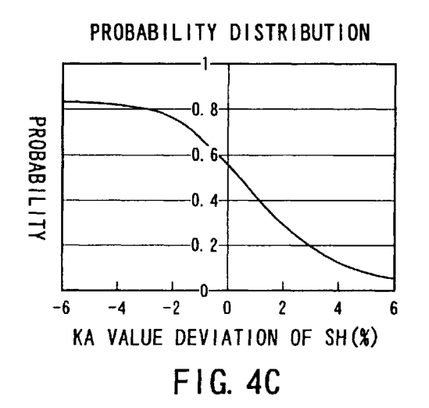
Figure 4D:
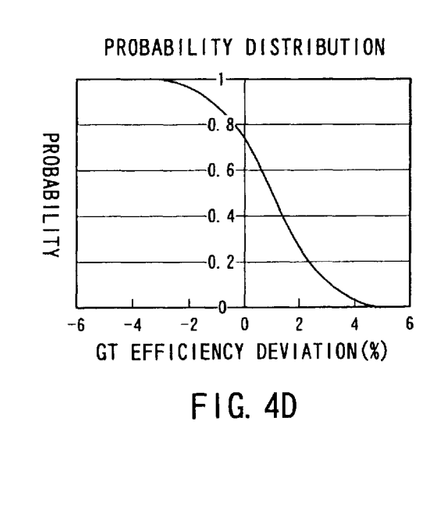
Figure 4E:
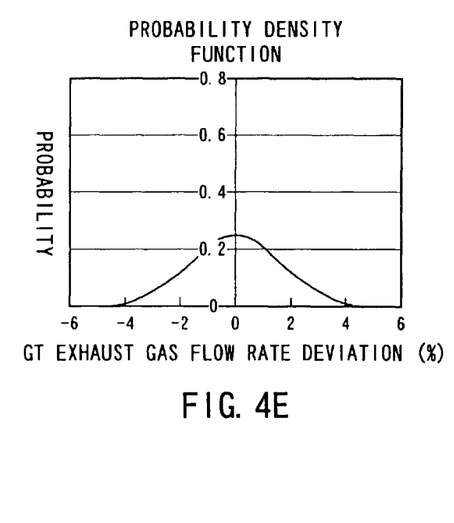
Figure 4F:
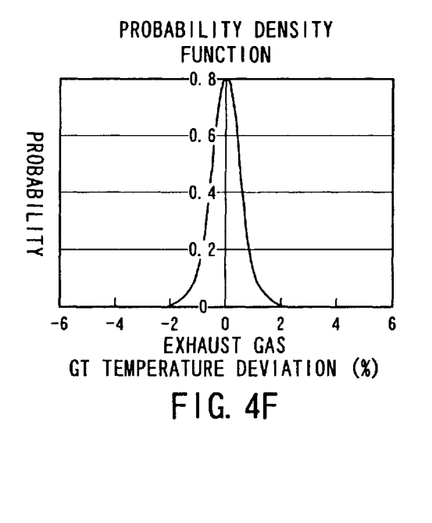

FIG. 4A to FIG. 4F are graphs showing the correlation between the maximum probability point and each parameter deviation, which are used in the case of calculating the probability in optimum state estimation. In this case, the calculation of each probability function is determined by taking the accuracy of each parameter into consideration. FIG. 4A shows the deviation of HRSG efficiency between the input/output method and the heat loss method and its probability. FIG. 4B shows the deviation of the ST 7 efficiency between calculated value and design value and its probability. FIG. 4C shows the deviation of KA value of the superheater (SH) 15 between the calculated value and the design value and its probability. FIG. 4D shows the deviation of GT 4 efficiency between the calculated value and the design value and its probability. FIG. 4E shows the deviation of an exhaust gas flow rate of the gas turbine 4 between the optimum value and the measured value and its probability. FIG. 4F shows the deviation of an exhaust gas temperature of the gas turbine 4 between the calculated value and the design value and its probability.

In this case, the probability function "F" of the entire plant is expressed in the form of the product by the probability function of each parameter. More specifically, the probability function "F" is expressed by the following equation (5).

[Equation 5]

$$F = fa \cdot fb \cdot fc \tag{5}$$

In this embodiment, before the analysis is made by using measured data of the actual operating plant, the inventors have confirmed that the reproductive value of the heat balance obtained by inputting design data to the heat balance preparing program coincides with the heat balance based on the design. Furthermore, the inventors have confirmed that the calculation values of the HRSG efficiency by the input/output heat method and the heat loss method coincide with each other. These results are shown in the following Table 1.

TABLE 1

| | | | HRSG efficiency (%) | | HRSG exchange heat value (Mcal/h · °C.) | | | | |
|---|---|---|---|---|---|---|---|---|---|
| | A | B | Input/output heat method | Heat loss method | SH | High pressure EV | High pressure EC | Low pressure EV | Low pressure EC |
| Manufacture preset value | 29.3 | 86.1 | — | — | 341 | 1135 | 472 | 783 | 669 |
| Reproductive result by applicant | 29.3 | 86.1 | 60.7 | 60.7 | 341 | 1135 | 472 | 783 | 669 |

A: GT room efficiency (%)
B: ST internal efficiency (%)
HRSG: Heat Recovery Steam Generator
SH: Superheater
GT: Gas Turbine
ST: Steam Turbine Next, a diagnostic comparison is made between this embodiment carrying out the aforesaid optimum state estimation and the example carrying out no optimum state estimation. The results are shown in the following Table 2.

TABLE 2

|  | GT η (%) | HRSG η (%) | ST η (%)/(%) | SH heat transfer performance (Mcal/h · °C.) |
|---|---|---|---|---|
| direct input calculation | 86.7 | 59.1 | 102.3/87.1 | 368/341 |
| optimum heat balance | 89.99 | 60.6 | 85.9/87.1 | 335/341 |

As shown in Table 2, in the case of direct input calculation, the calculation was conducted by using the measured GT exhaust gas flow and the GT exhaust gas temperature themselves without carrying out the optimum state estimation. As a result, the ST efficiency and the SH heat transfer performance showed values about 10% higher than each design value. It can be considered that this was caused by dispersion in data accuracy. In reality, such improvement in performance is difficult to obtain, and as seen clearly from FIG. 4B and FIG. 4C, the calculated probability function reaches approximately zero.

On the other hand, although this embodiment using the above-described optimum state estimation utilized the same data as the comparative example, as shown in Table 2, the ST efficiency and SH heat transfer performance, which greatly exceed the design value in the conventional method, showed a value in the vicinity of the design value, and the probability function greatly improves.

More specifically, when the exhaust gas flow rate deviation is −1%, the probability function of the whole plant becomes maximum. As is apparent from FIG. 4E, this results from the fact that the probability function of this parameter is not greatly reduced when the deviation is −1%. Moreover, as to the fact that the optimum estimation flow rate was situated on the minus side from the measured value, it is considered that this results from the following, namely, that the flow meter of the bell-mouth type used for the exhaust gas calculation is contaminated due to aged deterioration by dust adhesion, etc., resulting in, the measured pressure difference increasing in the same flow rate. For this reason, the flow rate is easily measured as being slightly larger than the true value and therefore, in this embodiment, the actual conditions are well reflected by using the maximum probability.

Accordingly, the following items have been confirmed from the analysis results shown in Table 2. Namely, the optimum state estimation for the heat balance can be carried out, and the influence due to the dispersion of the data can be greatly reduced. As a result, it is possible to improve the accuracy of the diagnosis.

Next, in this embodiment, the thermal efficiency deterioration causative equipment is specified on the basis of the degree of contribution to the performance of each equipment, which is calculated as the product of the performance change of each equipment from the design and its influence coefficient.

Figure 5:
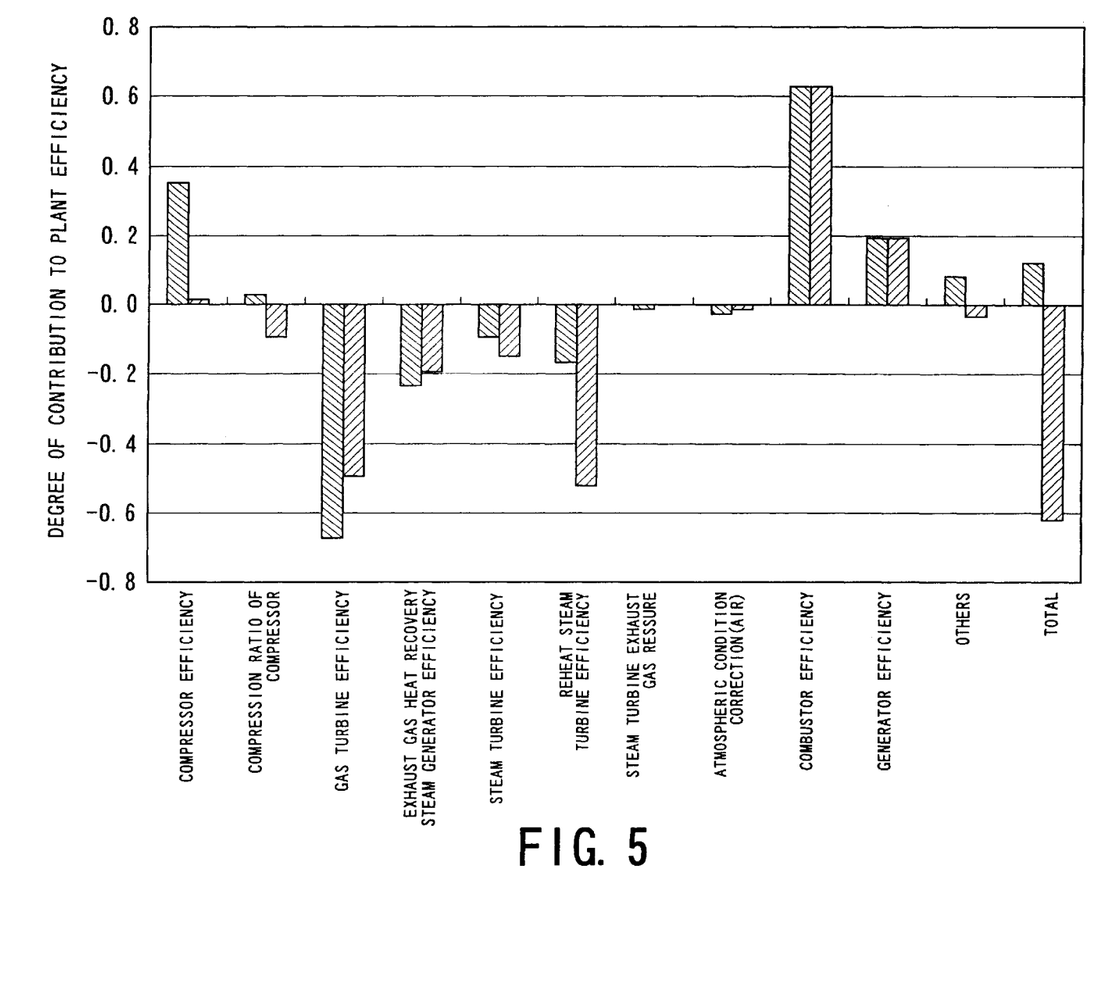
FIG. 5 is a graph showing a degree of contribution of each equipment to a plant efficiency in a performance test conducted when the plant was newly operated and when the plant had been operated for a predetermined time.

FIG. 5 is a bar graph showing the degree of contribution of each equipment to the plant efficiency in a performance test when the plant is initially operated in the beginning and after being operated for a predetermined time.

In the graph of FIG. 5, the inclined hatching portion on the left side shows data when the plant is operated in the beginning, while the inclined hatching portion on the right side shows data after being operated for a certain period of time. In FIG. 5, the reference line (the line when the degree of contribution is 0%) expresses the design base and the upper side from the reference line shows the factor contributing to increasing thermal efficiency. On the other hand, the lower side shows the factor contributing to reducing thermal efficiency.

The analysis after the plant has been operated, as shown on the right side hatching portion of FIG. 5, is compared with the analysis when the plant is initially installed, as shown on the left side hatching portion, and it can be seen that the compressor efficiency and the reheat steam turbine efficiency become even lower than before. These are the main causes for reduction of the whole plant efficiency.

Figure 6:
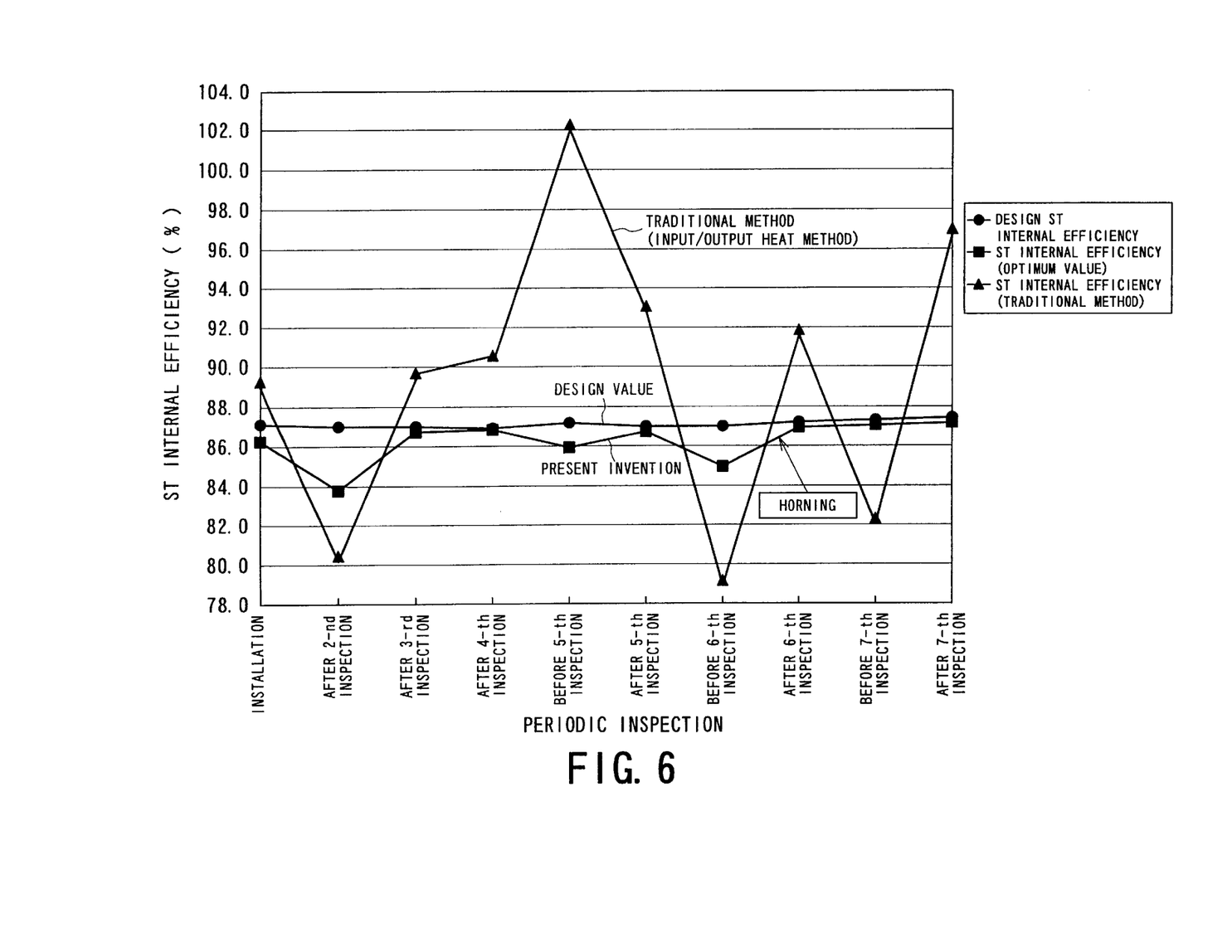
FIG. 6 shows an effect of the embodiment and is a graph showing a history a steam turbine internal efficiency performance.
Figure 7:
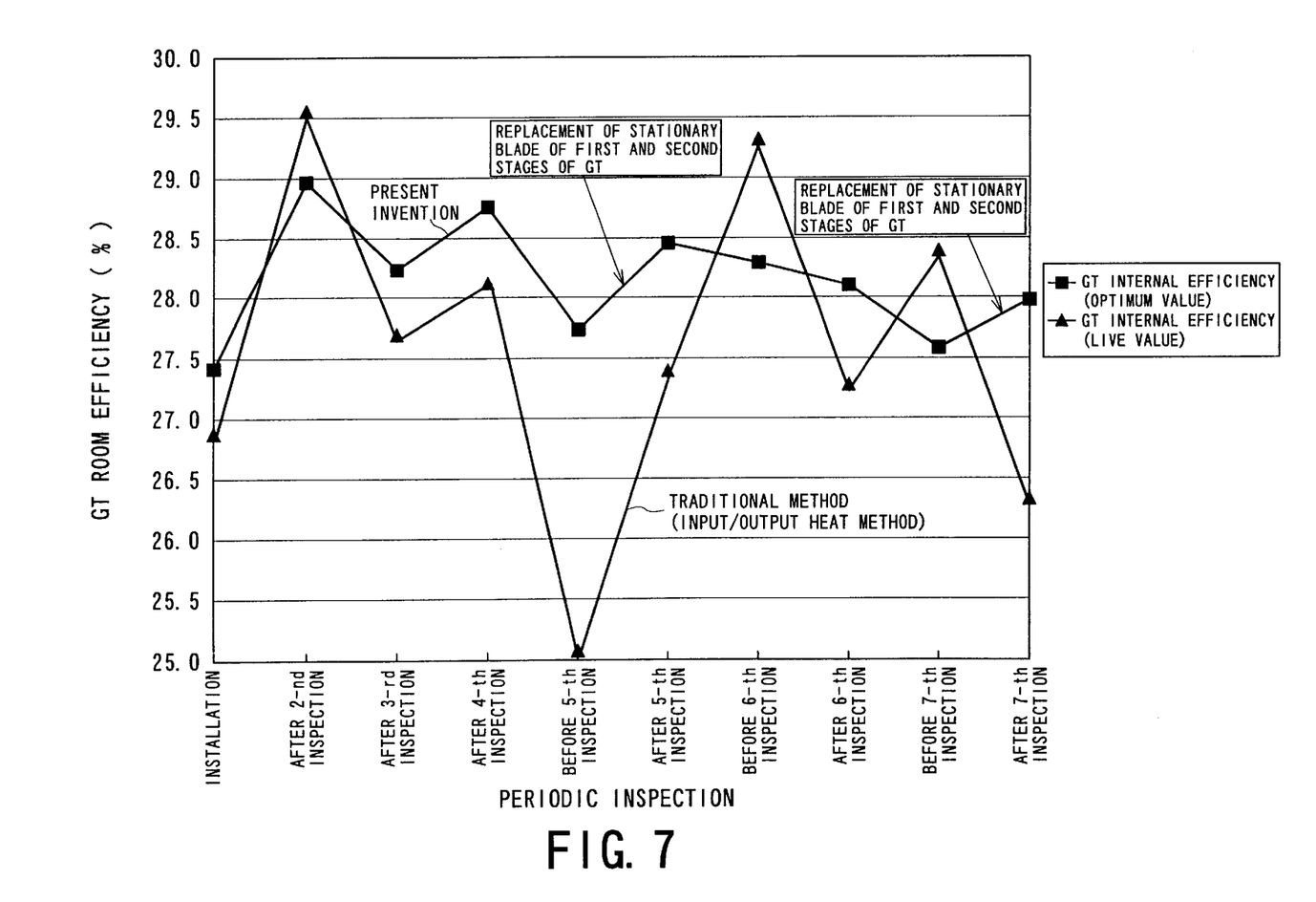
FIG. 7 shows an effect of the embodiment, and is a graph showing a history of a gas turbine internal efficiency performance.

The following is a description on the effects of this embodiment on the basis of the detailed data obtained from the aging trend analysis. FIG. 6 shows the history of the steam turbine (ST) internal efficiency and FIG. 7 shows the history of the gas turbine (GT) room efficiency. The histories shown in FIG. 6 and FIG. 7 represent the cases in which diagnosis by the present invention carrying out the optimum state estimation and diagnosis by the conventional input/output heat method are made on the basis of data before and after the periodic inspection, that is, about 10 years from time of installation to the present in the above-described combined power generation plant.

As shown in FIG. 6, in the comparison of the steam turbine internal efficiency history, the design value is about 87%, which is calculated from the manufacturer's performance curve and shows good stability. On the contrary, the value (live value) by the input/output heat method greatly fluctuates, lying between about 80% to 100% or more. However, it is difficult to imagine such a large change in efficiency occurring. On the other hand, in the case of carrying out optimum state estimation by the present invention, the efficiency value is within the range of the design value or slightly less, and the change is about 3%, thus being stable.

As seen from FIG. 6, in the sixth periodic inspection, honing of the turbine blades was carried in order to improve efficiency. As a result, the optimum state estimation shows the proper value with respect to the anticipated improvement of the efficiency.

Moreover, as shown in FIG. 7, in the comparison of gas turbine room efficiency history, the value by the input/output heat method exhibits large change, while on the contrary, the value of the optimum state estimation by the present invention exhibits an appropriate value of change which is considered stable. In the fifth and seventh periodic inspections, the turbine stationary blades were changed in order to improve efficiency. As a result, the optimum state estimation exhibits a proper value with respect to the anticipated improvement of efficiency. However, in spite of the turbine stationary blades being repaired in the seventh inspection, gas turbine efficiency was reduced in the input/output heat method.

Figure 8:
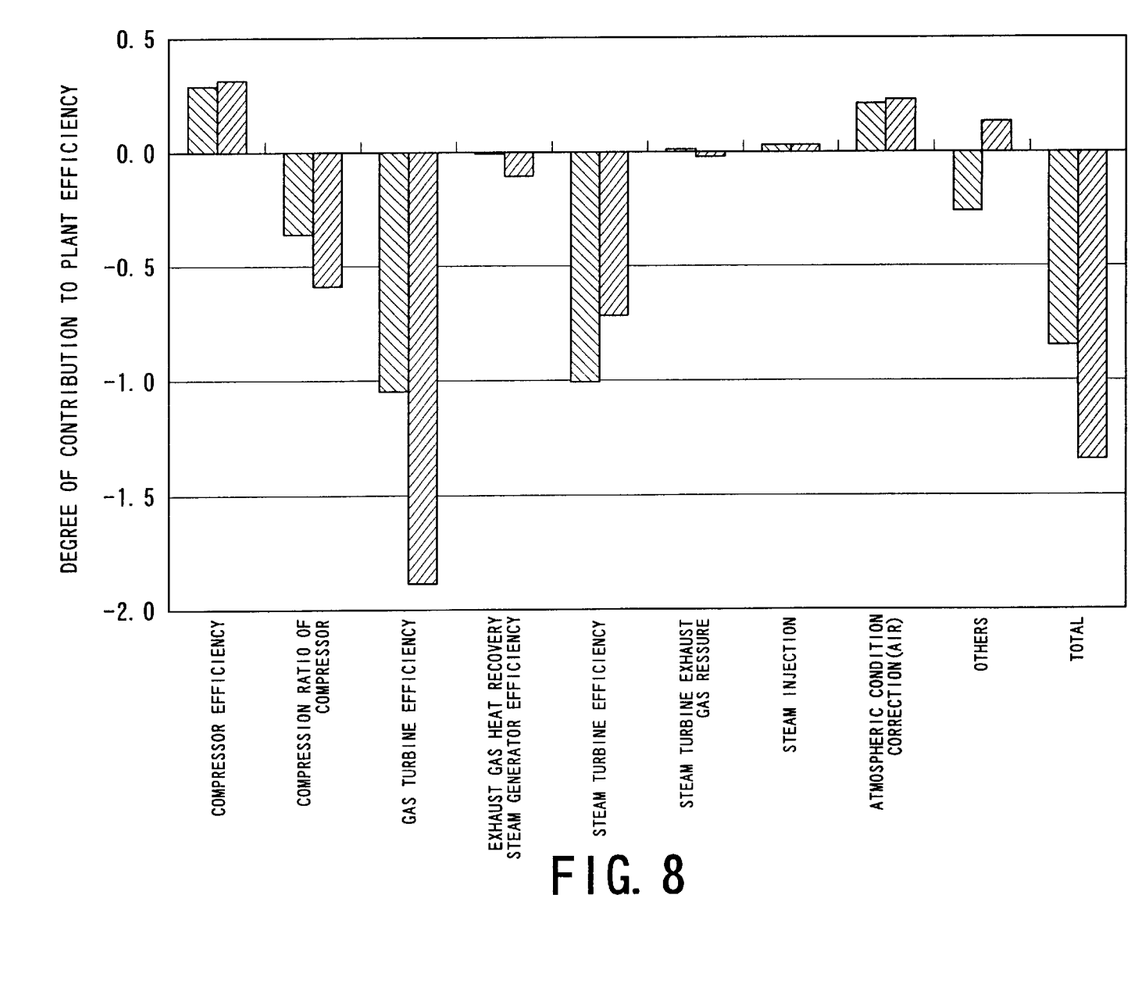
FIG. 8 is a graph showing a performance change data before and after a blade breakdown in the prior art method.
Figure 9:
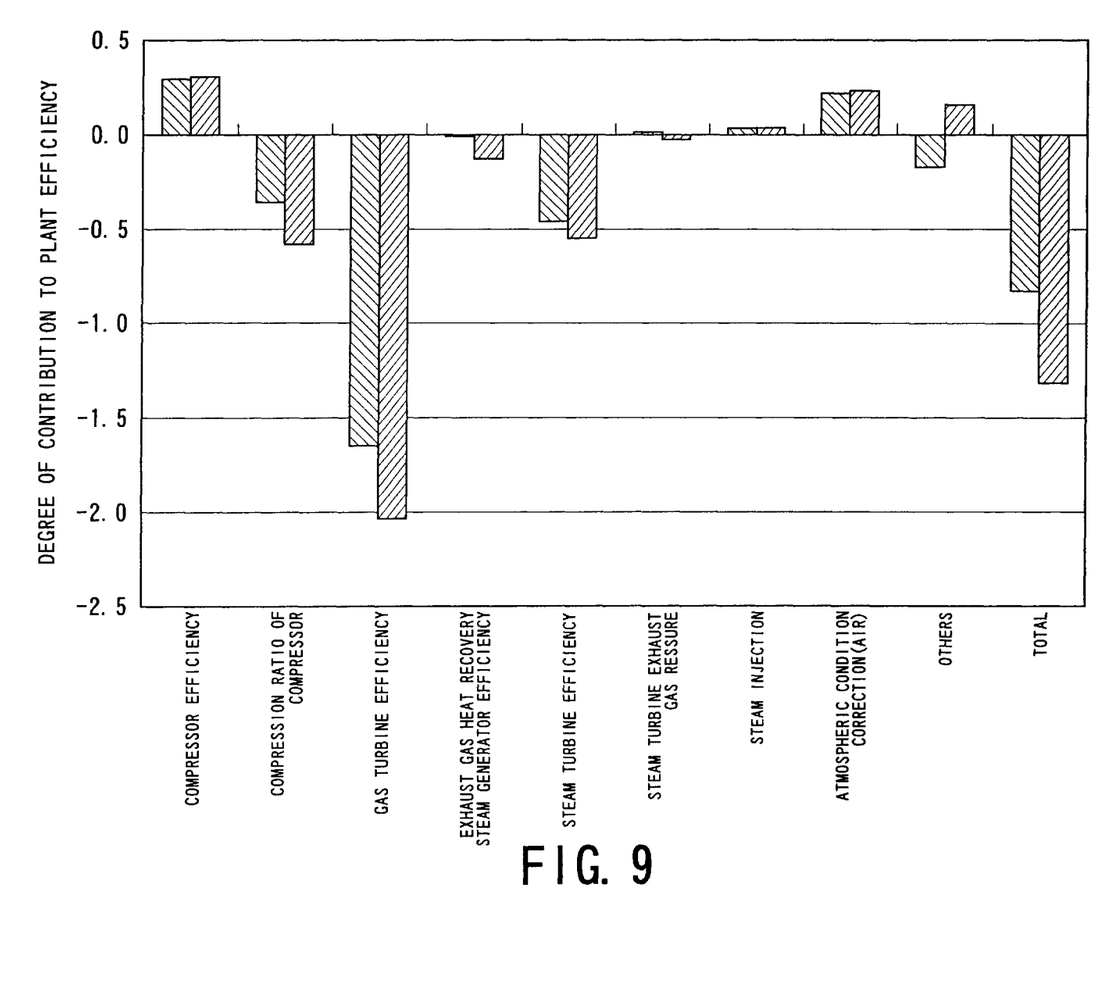
FIG. 9 is a graph showing a performance change data before and after a blade breakdown in the present invention.

FIG. 8 shows the performance change of each equipment in a combined cycle plant before and after a set of steam turbine blades broke down, as in the conventional method. Hereby, an inconsistency occurs, namely steam turbine performance was improved despite the set of steam turbine blades breaking down. On the contrary, in the case of applying the method of the present invention, as shown in FIG. 9, the performance was reduced after the set of the steam turbine blades broke down. It can be said that the diagnosis by the present invention well reflects the situation of the actual operating plant.

As described above, the conventional method has such problems that the steam turbine performance can not be calculated accurately, etc. On the contrary, in the case of the present invention, it is possible to improve the diagnostic accuracy by providing the optimum heat balance in which the probability function can be greatly improved.

Furthermore, the applicants have already proposed a shaft torque meter which can directly divide and measure combined output of the GT and the ST with a structure in which each turbine is connected to the same generator through each shaft. By using this shaft torque sensor, it becomes possible to directly divide the power outputs of the gas turbine and the steam turbine. In this case, performance error estimation of the principal equipment is shown in the following Table 3.

TABLE 3

|  | η GT (%) | η HRSG (%) | η ST (%) |
|---|---|---|---|
| C/C conventional method | 7.9 | 3.2 | 15.6 |
| C/C heat balance analysis (reference) | 2.4 | 1.1 | 4.8 |
| C/C use of torque sensor | 0.56 | 0.93 | 0.77 |

C/C: combined cycle

As shown in the above-described Table 3, it can be seen that the diagnostic accuracy in the use of the shaft torque sensor is improved to a much higher extent than in the case of the conventional technique. The above-described calculation accuracy is obtained on the basis of the following equations (for the case in which the shaft torque is measured in the position of the steam turbine side coupling).

(1) Steam turbine efficiency $$\eta ST = WST/Wwtr$$

The following equation can be obtained by differentiating both sides from the ST efficiency calculating equation,
[Equation 6]

$$|\delta\eta ST/\eta ST| = |\delta WST/WST| + |\delta Wwtr/Wwtr| = 0.77\% \quad (6)$$

(2) Gas turbine efficiency $$\eta GT = WGT/WLNG$$

The following equation can be obtained by differentiating both sides from the GT efficiency calculating equation,
[Equation 7]

$$|\delta\eta GT/\eta GT| = |\delta WGT/WGT| + |WLNG/WLNG| = 0.56\% \quad (7)$$

(3) Exhaust gas heat recovery steam generator efficiency

[Equation 8]

$$\eta HRSG = Wwtr/Wgas = Wwtr/(WLNG-WGT)$$

The following equation can be obtained by differentiating both sides from the HRSG efficiency calculating equation, $$|\delta\eta HRSG/\eta HRSG| = |\delta Wwtr/Wwtr| + WLNG/(WLNG-WGT)|\delta WGT/WGT| + WLNG/(WLNG-WGT)|\delta WLNG/WLNG| = 0.93\% \quad (8)$$

Moreover, the following Table 4 shows comparative data between the- heat balance analysis results and the results obtained by using a torque meter.

TABLE 4

|  | 1999 Dec. 10 |
|---|---|
| Generator power output (actually measured) | 153.1 MW |
| ST power output (conventional method) | 49.5 MW (7.4%) |
| ST power output (optimum value by heat balance analysis) | 46.1 MW (reference) |
| ST power output (torque meter) | 44.6 MW (−3.2%) |
| Plant efficiency | 41.63% |

From the above-described Table 4, it can be seen that the steam turbine power output obtained by the heat balance analysis coincides with the steam turbine power output obtained by the torque meter when each calculation accuracy is taken into consideration.

Moreover, it can be seen that the steam turbine output obtained by the conventional method is different from the two above-described outputs by about 10%. However, the present invention is not limited to the embodiment described above, and is applicable to various scales and types of combined power generation plants.

As is evident from the above description of the preferred embodiment, according to the present invention, the optimum state estimation is used, and accordingly, it is possible to readily specify the causative equipment which reduces thermal efficiency and to improve the accuracy of thermal efficiency diagnosis in a combined power generation plant. Furthermore, it is possible to effectively perform thermal efficiency diagnosis and to accurately analyze the influence of performance change of each equipment on the whole plant. It is also possible to more properly recover thermal efficiency through periodic inspection, repair and the like and to obtain great benefits in economy.

What is claimed is:

1. A thermal efficiency diagnostic method of a combined power generation plant including a gas turbine facility and a steam turbine facility, comprising the steps of:

preparing measurement values of parameters including at least one of temperature, pressure, flow rate and electric power output relative to an energy input and an energy output with regard to respective equipment of the combined power generation plant, and recording a design value of each equipment;

extracting a portion of the measurement value as measurement data that has high accuracy, which is a fixed value, as standard parameters through optimum state estimation of a heat balance;

extracting a portion of the measurement value as another measurement data which significantly affects diagnostic results and which is difficult to measure with high accuracy and deemed to be low accuracy, as key parameters;

calculating an entire probability of the heat balance by using a number of calculation data of the heat balance as reference parameters, which are then compared with their reference values to calculate a probability of each of the reference parameters;

conducting and determining an optimum state estimation of the heat balance by adjusting the key parameters to be consistent with the standard parameters, so that each deviation of reference parameters becomes minimum as a whole and the probability becomes maximum in the combined power generation plant;

comparing the optimum state estimation of the heat balance with a heat balance based on the design value;

analyzing a degree of contribution of performance of each of the respective equipment to a thermal efficiency; and specifying the equipment that causes a heat efficiency deterioration in accordance with the degree of contribution of the performance of each equipment.

2. A thermal efficiency diagnostic method according to claim 1, wherein a generator power output is used as the standard parameter having high measurement accuracy.

3. A thermal efficiency diagnostic method according to claim 1, wherein a gas turbine exhaust gas flow rate and a gas turbine exhaust gas temperature are used as the key parameters which affect the diagnostic results to a large degree and which are difficult to be measured with high accuracy and to be adjusted through optimum state estimation.

4. A thermal efficiency diagnostic method according to claim 1, wherein at least one of a deviation of HRSG efficiency between the different calculation methods, an ST efficiency between the calculation value and the design value, a GT efficiency between the calculation value and the design value, and a turbine power output between the measurement value by a torque sensor and the calculation value are used as reference parameters to calculate the probability of the heat balance.

5. A thermal efficiency diagnostic apparatus of a combined power generation plant including a gas turbine facility and a steam turbine facility, comprising:

a sensor for measuring heat input and output of respective equipment constituting a combined power generation plant;

a memory means for storing measurement data output from the sensor together with a design value and a calculation value of parameters including at least one of temperature, pressure, flow rate and electric power output related to a heat balance;

a heat balance calculating means for accurately calculating energy input and output of individual equipment in the entire combined power generation plant;

an optimum state estimation means for calculating an optimum heat balance by using accurate measurement values as standard parameters, which are fixed values, and adjusting key parameters, which significantly influence the result of the diagnosis and are difficult to obtain with high accuracy, so that a deviation of reference parameters becomes minimum in the entire combined power generation plant and probability in which the heat balance of the power generation plant becomes maximum;

a comparing means for comparing the heat balance determined by the optimum state estimation means with a heat balance based on the design value; and a specifying means for analyzing a degree of contribution of performance of each equipment to a thermal efficiency and for specifying the equipment that causes a thermal efficiency deterioration on the basis of the degree of contribution.

* * * * *